(12) United States Patent
Kang (10) Patent No.: US 8,472,133 B2
(45) Date of Patent: Jun. 25, 2013

(54) MOTOR AND RECORDING DISK DRIVE DEVICE

(75) Inventor: Sang Sun Kang, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 236 days.

(21) Appl. No.: 12/929,334

(22) Filed: Jan. 14, 2011

(65) Prior Publication Data

US 2012/0120525 A1     May 17, 2012

(30) Foreign Application Priority Data

Nov. 15, 2010   (KR) .......................... 10-2010-0113404

(51) Int. Cl.
*G11B 17/02*     (2006.01)

(52) U.S. Cl.
USPC ..................................................... 360/99.08

(58) Field of Classification Search
USPC .......... 360/99.08, 99.12, 97.13, 98.08, 99.04, 360/97.11, 99.09, 99.18, 99.11
See application file for complete search history.

(56) References Cited

U.S. PATENT DOCUMENTS

| | | | | |
|---|---|---|---|---|
| 6,172,847 B1 * | 1/2001 | Sakatani et al. | ............ | 360/99.08 |
| 7,011,450 B2 * | 3/2006 | Kusaka et al. | ................ | 384/107 |
| 7,033,078 B2 * | 4/2006 | Murabe et al. | ................ | 384/114 |
| 2006/0140521 A1 | 6/2006 | Uenosono et al. | | |
| 2007/0172159 A1 * | 7/2007 | Komori et al. | ................ | 384/100 |
| 2007/0278881 A1 * | 12/2007 | Yamashita et al. | ................ | 310/90 |
| 2009/0168246 A1 * | 7/2009 | Kainoh et al. | ................ | 360/224 |
| 2009/0279819 A1 * | 11/2009 | Hori et al. | ...................... | 384/124 |
| 2009/0297078 A1 * | 12/2009 | Hori et al. | ...................... | 384/107 |
| 2010/0129014 A1 * | 5/2010 | Bitou et al. | .................. | 384/112 |
| 2010/0166344 A1 * | 7/2010 | Hori et al. | ...................... | 384/107 |
| 2010/0202715 A1 * | 8/2010 | Hirade et al. | ................. | 384/107 |
| 2010/0239196 A1 * | 9/2010 | Yamamoto et al. | ........... | 384/118 |
| 2011/0232093 A1 * | 9/2011 | Yamashita et al. | ......... | 29/898.02 |
| 2012/0237148 A1 * | 9/2012 | Niwa et al. | .................... | 384/114 |

FOREIGN PATENT DOCUMENTS

| | | |
|---|---|---|
| JP | 11-280755 | 10/1999 |
| JP | 2006-029559 | 2/2006 |
| JP | 2006-57800 | 3/2006 |
| JP | 2006-183787 | 7/2006 |

OTHER PUBLICATIONS

Korean Office Action dated Nov. 28, 2011 issued in corresponding Korean Patent Application No. 10-2010-0113404.

* cited by examiner

*Primary Examiner* — Allen T Cao (57) ABSTRACT

There is provided a motor allowing for an increase in the rigidity of a hydrodynamic bearing by controlling a gap between a shaft and a sleeve as well as minimizing power consumption and a recording disk derive device including the motor. The motor includes a sleeve having a cylindrical shape and including a hole whose inner circumferential surface has at least one dynamic pressure groove therein; and a shaft rotatably inserted into the hole of the sleeve and having at least one rigidity reinforcing portion protruding in an outer diameter direction from an outer circumferential surface thereof corresponding to the dynamic pressure groove.

10 Claims, 6 Drawing Sheets

MOTOR AND RECORDING DISK DRIVE DEVICE

CROSS-REFERENCE TO RELATED APPLICATIONS

This application claims the priority of Korean Patent Application No. 10-2010-0113404 filed on Nov. 15, 2010, in the Korean Intellectual Property Office, the disclosure of which is incorporated herein by reference.

BACKGROUND OF THE INVENTION

1. Field of the Invention

The present invention relates to a motor and a recording disk drive device, and more particularly, to a motor that can ensure the rigidity of a hydrodynamic bearing as well as minimize power consumption during the driving of the motor and a recording disk drive device including the motor.

2. Description of the Related Art

A small-sized spindle motor, used in a recording disk drive device, includes a stator having a coil wound therearound and a rotor rotated by electromagnetic force generated by voltage applied to the coil.

Such a small-sized spindle motor uses a hydrodynamic bearing assembly. While lubricating fluid is interposed between a shaft and a sleeve of the hydrodynamic bearing assembly, the shaft is supported by fluid pressure generated by the lubricating fluid.

In a case in which a gap between the shaft and the sleeve narrows, the rigidity of a hydrodynamic bearing, generated between the shaft and the sleeve, increases to thereby achieve an increase in the stability of the motor. In this case, however, power consumption used for the rotation of the shaft increases.

Therefore, the provision of a motor that can ensure the rigidity of the hydrodynamic bearing while minimizing power consumption is required.

SUMMARY OF THE INVENTION

An aspect of the present invention provides a motor allowing for an increase in the rigidity of a hydrodynamic bearing by controlling a gap between a shaft and a sleeve as well as minimizing power consumption and a recording disk derive device including the motor.

According to an aspect of the present invention, there is provided a motor including: a sleeve having a cylindrical shape and including a hole whose inner circumferential surface has at least one dynamic pressure groove therein; and a shaft rotatably inserted into the hole of the sleeve and having at least one rigidity reinforcing portion protruding in an outer diameter direction from an outer circumferential surface thereof corresponding to the dynamic pressure groove.

The rigidity reinforcing portion may have a width smaller than that of the corresponding dynamic pressure groove.

The rigidity reinforcing portion may have a width half that of the corresponding dynamic pressure groove.

The rigidity reinforcing portion may have a central portion disposed to correspond to a portion of the corresponding dynamic pressure groove in which the largest amount of dynamic pressure is generated.

The rigidity reinforcing portion may include at least two rigidity reinforcing portions protruding to have different lengths.

The dynamic pressure groove may include at least two dynamic pressure grooves, and the rigidity reinforcing portion corresponding to one of the dynamic pressure grooves closest to a center of gravity of the motor may protrude to have the largest length.

According to another aspect of the present invention, there is provided a motor including: a shaft having at least one dynamic pressure groove in an outer circumferential surface thereof; and a sleeve having the shaft rotatably inserted thereinto and having at least one rigidity reinforcing portion protruding in an inner diameter direction from an inner circumferential surface thereof corresponding to the dynamic pressure groove.

The rigidity reinforcing portion may have a width smaller than that of the corresponding dynamic pressure groove.

The rigidity reinforcing portion may have a central portion disposed to correspond to a portion of the corresponding dynamic pressure groove in which the largest amount of dynamic pressure is generated.

According to another aspect of the present invention, there is provided a motor including: a sleeve having the shaft rotatably inserted thereinto; and a fluid filling a gap between the shaft and the sleeve and generating dynamic pressure when the shaft rotates, wherein at least one dynamic pressure groove is formed in one surface of an outer circumferential surface of the shaft or an inner circumferential surface of the sleeve so as to generate the dynamic pressure, and at least one rigidity reinforcing portion protrudes from the other surface thereof so as to correspond to the dynamic pressure groove.

The rigidity reinforcing portion may have a width smaller than that of the corresponding dynamic pressure groove.

The rigidity reinforcing portion may have a central portion disposed to correspond to a portion of the corresponding dynamic pressure groove in which the largest amount of dynamic pressure is generated.

According to another aspect of the present invention, there is provided a recording disk drive device including: the motor as described above; a head transfer unit transferring a head, detecting information on a recording disk to be mounted on the motor, to the recording disk; and a housing receiving the motor and the head transfer unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Prior to a detailed description of the present invention, the terms and words, which are used in the specification and claims to be described below, should not be construed as having typical or dictionary meanings. The terms and words should be construed in conformity with the technical idea of the present invention on the basis of the principle that the inventor can appropriately define terms in order to describe his invention in the best way. Embodiments described in the specification and structures illustrated in the accompanying drawings are merely exemplary embodiments of the present invention. Thus, it is intended that the present invention cover all possible modifications and variations of the exemplary embodiments, provided they fall within the scope of their equivalents at the time of the filing of this application.

Exemplary embodiments of the present invention will be described in detail with reference to the accompanying drawings. The same reference numerals will be used throughout to designate the same or like components in the accompanying drawings. Moreover, detailed descriptions related to well-known functions or configurations will be ruled out in order not to unnecessarily obscure the subject matter of the present invention. In the drawings, the shapes and dimensions of some elements may be exaggerated, omitted or schematically illustrated. Also, the size of each element does not entirely reflect an actual size.

Meanwhile, terms with regard to directions are defined as follows. As viewed in FIG. 1, an axial direction refers to a vertical direction on the basis of a shaft 11, and outer and inner diameter directions refer to an outer edge direction of a rotor 40 on the basis of the shaft 11 and a central direction of the shaft 11 on the basis of the outer edge of the rotor 40, respectively.

Hereinafter, exemplary embodiments of the present invention will be described in detail with reference to the accompanying drawings.

Figure 1:
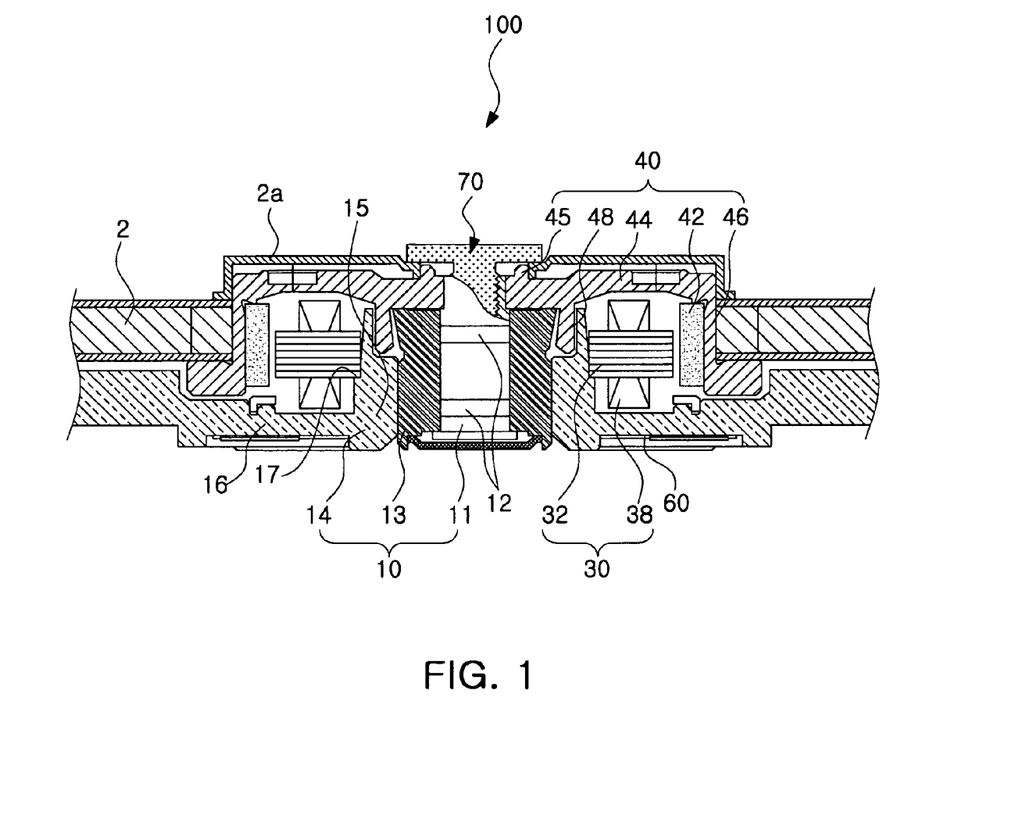
FIG. 1 is a schematic sectional view illustrating a motor according to an exemplary embodiment of the present invention.
Figure 2:
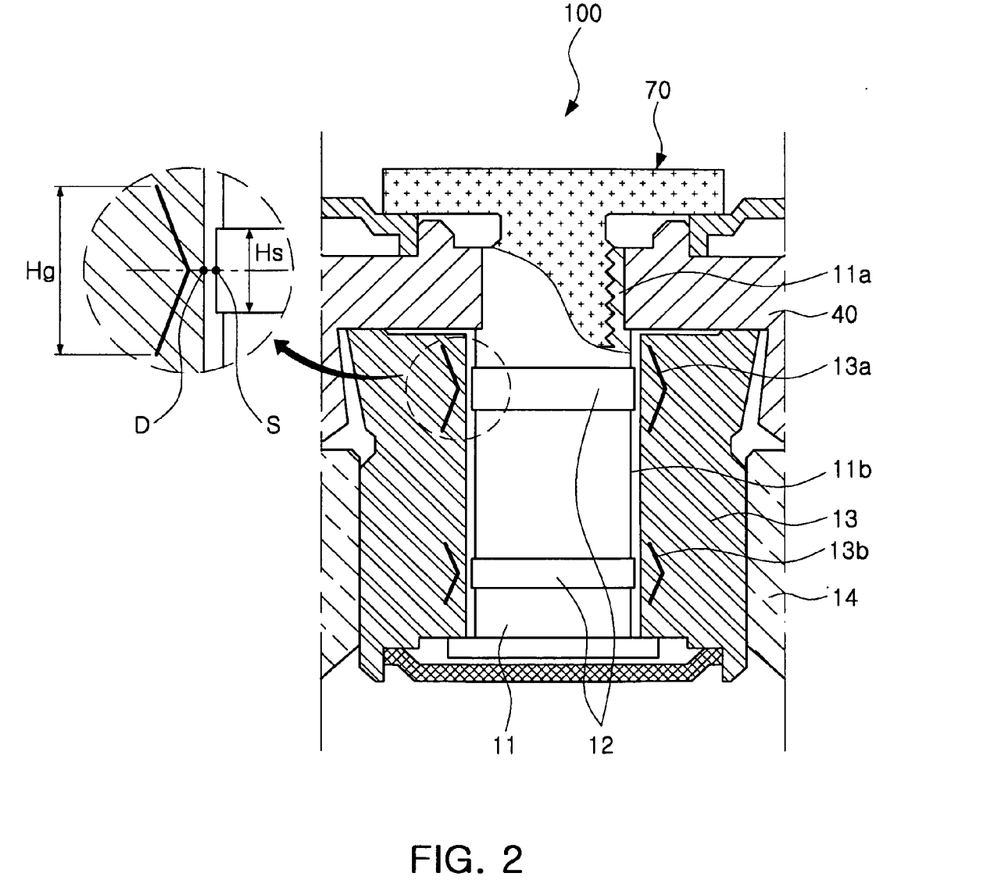
FIG. 2 is an enlarged sectional view illustrating a bearing assembly of FIG. 1.

FIG. 1 is a schematic sectional view illustrating a motor according to an exemplary embodiment of the present invention. FIG. 2 is an enlarged sectional view illustrating a bearing assembly of FIG. 1.

Referring to FIGS. 1 and 2, a motor 100 according to the present embodiment is a spindle motor that is applied to a hard disk drive (HDD) and includes a bearing assembly 10, a stator 30, and the rotor 40.

The bearing assembly 10 includes the shaft 11, a sleeve 13 and a base 14 having a circuit board 60 attached thereto.

The shaft 11 forms the axis of rotation of the rotor 40 to be described below. The shaft 11 according to this embodiment may have a cylindrical shape and a fixing member 70 may be fixedly inserted thereinto.

The shaft 11 according to this embodiment includes a screw thread portion 11a and a body portion 11b.

The screw thread portion 11a is formed in an upper portion of the shaft 11. The fixing member 70 is screw-coupled to a screw thread formed on an inner circumferential surface of the shaft 11.

The body portion 11b extends downwardly from the screw thread portion 11a in the axial direction to thereby form a body of the shaft 11. The body portion 11b is inserted into the sleeve 13 and rotates within the sleeve 13 by the medium of an oil film which is formed between the sleeve 13 and the shaft 11.

Here, a fluid may be filled between the sleeve 13 and the shaft 11. As the fluid serves as a lubricant, the fluid reduces friction between the sleeve 13 and the shaft 11 during rotation.

Also, the shaft 11 according to this embodiment has one or more rigidity reinforcing portions 12 on an outer circumferential surface of the body portion 11b.

The rigidity reinforcing portions 12 protrude from the outer circumferential surface of the body portion 11b in the outer diameter direction. The rigidity reinforcing portions 12 have a ring shape and are formed on the outer circumferential surface of the body portion 11b.

The rigidity reinforcing portions 12 according to this embodiment are disposed to correspond to dynamic pressure grooves of the sleeve 13 to be described below. In the present embodiment, an upper dynamic pressure groove 13a and a lower dynamic pressure groove 13b are formed in an inner circumferential surface of the sleeve 13, and accordingly, two rigidity reinforcing portions 12 are disposed to correspond to the upper dynamic pressure groove 13a and the lower dynamic pressure groove 13b, respectively.

Here, a central portion S of the rigidity reinforcing portion 12 is disposed to correspond to a portion D of the dynamic pressure groove (hereinafter, referred to as a "dynamic pressure line D") in which the largest amount of dynamic pressure is generated. That is, according to the present embodiment, the central portion S of the rigidity reinforcing portions 12 and the dynamic pressure line D of the corresponding dynamic pressure grooves 13a and 13b are disposed on the same level.

Also, the rigidity reinforcing portions 12 according to the present embodiment have a width smaller than that of the corresponding dynamic pressure grooves 13a and 13b. More specifically, the width Hs of the rigidity reinforcing portions 12 may be half that of the entire width Hg of the corresponding dynamic pressure grooves 13a and 13b.

The rigidity reinforcing portions 12 may be formed by polishing an outer circumferential surface of the shaft 11 so as to form a step; however, the invention is not limited thereto. For example, the rigidity reinforcing portions 12 may be formed by mechanical processing as well as chemical processing such as etching. After the rigidity reinforcing portions 12 are separately formed, they may be coupled to the shaft 11. That is, various types of alternatives are available.

The shaft 11 according to the present embodiment has the rigidity reinforcing portions 12 protruding from the body portion 11b of the shaft 11, and thus, an outer diameter of the shaft 11 is extended in locations in which the rigidity reinforcing portions 12 are formed. Accordingly, a gap between the inner circumferential surface of the sleeve 13 having the dynamic pressure grooves 13a and 13b formed therein and the rigidity reinforcing portions 12 formed on part of the shaft 11 is relatively narrow, as compared with a gap between the inner circumferential surface of the sleeve 13 and the other part of the shaft 11.

The shaft 11 according to the present embodiment is inserted into the sleeve 13 while allowing the screw thread portion 11a to protrude outwardly of the sleeve 13, that is, upwardly thereof in the axial direction. The rotor 40 to be described below is coupled to an outer circumferential surface of the screw thread portion 11a protruding outwardly of the sleeve 13.

The sleeve 13 has a cylindrical shape and the shaft 11 is inserted into a hole formed within the sleeve 13. The sleeve 13 is a rotation support member that supports the shaft 11 by forming the oil film between the sleeve 13 and the shaft 11 such that the shaft 11 can easily be rotated therein.

At least one or more dynamic pressure grooves 13a and 13b that generate hydrodynamic pressure may be formed in the inner circumferential surface of the sleeve 13. These dynamic pressure grooves 13a and 13b and the fluid serve as a hydrodynamic pressure bearing between the shaft 11 and the sleeve 13 when the shaft 11 is rotated.

The dynamic pressure grooves according to the present embodiment include the upper dynamic pressure groove 13a disposed on an upper portion of the sleeve 13 in the axial direction and the lower dynamic pressure groove 13b disposed under the upper dynamic pressure groove 13a. However, the invention is not limited thereto. Only a single dynamic pressure groove or three or more dynamic pressure grooves may be formed. Also, as described above, the dynamic pressure grooves 13a and 13b are disposed to correspond to the rigidity reinforcing portions 12 of the shaft 11.

The outer circumferential surface of the sleeve 13 is press-fitted into the base 14 to be described below so that the sleeve 13 is fixed to the base 14.

The base 14 is a support member that supports the entirety of components of the motor 100. In particular, the base 14 includes a sleeve support portion 15 rotatably supporting the shaft 11 by the medium of sleeve 13 and a plate portion 16 having a lower surface to which a circuit board 60 to be described below is attached. The sleeve support portion 15 has a cylindrical shape, and the sleeve 13 and the shaft 11 are inserted into the sleeve support portion 15. The stator 30 to be described below is mounted on an outer circumferential surface of the sleeve support portion 15. To this end, the outer circumferential surface of the sleeve support portion 15 has a mounting portion 17 partially protruding in the outer diameter direction to thereby form a step.

The circuit board 60 has circuit patterns (not shown) therein to apply power to the motor 100. The circuit board 60 is electrically connected to a winding coil 38 and applies power to the winding coil 38. Also, ground patterns among the circuit patterns of the circuit board 60 may be electrically connected to the base 14. As for the circuit board 60, various kinds of boards, such as a general printed circuit board (PCB) or a flexible PCB, may be used according to necessity.

The stator 30 includes a core 32 and the winding coil 38 wound around an outer circumferential surface of the core 32. The stator 30 is a stationary part that is received inside the rotor 40.

The core 32 may be formed by stacking a plurality of iron plates, which extend radially in the outer diameter direction of the shaft 11 on the basis of a central axis of the shaft 11. This core 32 is mounted on the mounting portion 17 of the base 14 and is fixedly coupled to the base 14.

The winding coil 38, which is wound around the core 32, generates electromagnetic force when power is applied thereto. The winding coil 38 according to this embodiment is electrically connected to the circuit board 60 through a conducting wire (not shown) and is thereby supplied with external power. However, the invention is not limited thereto. Various configurations are allowed, as long as the circuit board 60 and the winding coil 38 are electrically connected to each other.

The rotor 40 includes a magnet 42 and a rotor case 44.

The magnet 42 is an annular permanent magnet that has magnetic north and south poles magnetized alternately in the circumferential direction to thereby generate a magnetic force having a predetermined magnitude.

The rotor case 44 is shaped like a cup and includes a rotor hub 45, a magnet coupling portion 46, and a rotor main wall 48.

The rotor hub 45 is coupled with an upper end of the shaft 11. As described above, the rotor hub 45 is coupled with the outer circumferential surface of the screw thread portion 11a protruding outwardly of the sleeve 13.

The magnet 42 is coupled with the magnet coupling portion 46, which is formed along an inner circumferential surface of the rotor case 44. Here, the magnet 42 is disposed to face the core 32 of the stator 30 to be described below. Therefore, when power is applied to the winding coil 38 wound around the core 32, the rotor 40 is rotated by electromagnetic interaction between the magnet 42 and the winding coil 38.

The rotor main wall 48 having a cylindrical shape protrudes from one surface, that is, a lower surface of the rotor case 44. The rotor main wall 48 is formed to partially receive the upper portion of the sleeve 13. A space between an inner circumferential surface of the rotor main wall 48 and the outer circumferential surface of the sleeve 13 may be extended downwardly in the axial direction. In this manner, the fluid filling a gap between the sleeve 13 and the shaft 11 may form an interface between the rotor main wall 48 and the sleeve 13. Such a fluid interface may serve as a sealing portion preventing the fluid from leaking outwardly.

Also, the motor 100 according to the present embodiment may further include a recording disk 2 fixedly mounted on the rotor case 44 and a clamp 2a fixing the recording disk 2. In this case, the clamp 2a may be fixed to the rotor case 40 by the fixing member 70 inserted into the shaft 11.

The motor 100 according to the present embodiment has the rigidity reinforcing portions 12 formed on the shaft 11 such that the outer diameter of the shaft 11 is extended as much as the rigidity reinforcing portions 12 protrude therefrom. That is, in the motor 100 according to this embodiment, the outer diameter of the shaft 11 is partially extended.

As described above, in the case in which the outer diameter of the shaft 11 is extended in locations in which the rigidity reinforcing portions 12 are formed, the gap between the inner circumferential surface of the sleeve 13 and the body portion 11b of the shaft 11 narrows, as compared with the other part thereof. Accordingly, an increase in the rigidity of a hydrodynamic bearing formed between the shaft 11 and the sleeve 13 when the shaft 11 is rotated may be achieved.

Meanwhile, as the gap between the sleeve 13 and the shaft 11 narrows, the increased rigidity of the hydrodynamic bearing may be exerted upon the rotation of the rotor 40 as resistance force. For this reason, power consumption for rotating the shaft 11 and rotor 40 may be increased.

However, the motor 100 according to this embodiment may have the rigidity reinforcing portions 12 formed only in locations corresponding to the dynamic pressure grooves 13a and 13b of the sleeve 13, rather than in the entirety of the outer circumferential surface of the shaft 11. Furthermore, the rigidity reinforcing portions 12 have the width Hs smaller than the width Hg of the corresponding dynamic pressure grooves 13a and 13b, rather than having a common width therewith. The rigidity reinforcing portions 12 are disposed to correspond to the portion D of the dynamic pressure grooves in which the largest amount of dynamic pressure is generated.

Therefore, since the shaft 11 and the sleeve 13 have the same gap therebetween in locations in which the dynamic pressure grooves 13a and 13b are not formed and in part of the dynamic pressure grooves 13a and 13b which do not correspond to the rigidity reinforcing portions, an increase in power consumption may be minimized and the rigidity of the hydrodynamic bearing may be ensured.

The motor 100 is not limited to the aforementioned embodiment. Various types of alternatives are available.

Motors according to exemplary embodiments to be described below have structures similar to that of the motor 100 according to the aforementioned embodiment as shown in FIG. 1, except for a hydrodynamic bearing structure. Therefore, a detailed description of the same elements will be omitted, and the hydrodynamic bearing structure will be described in detail.

Figure 3:
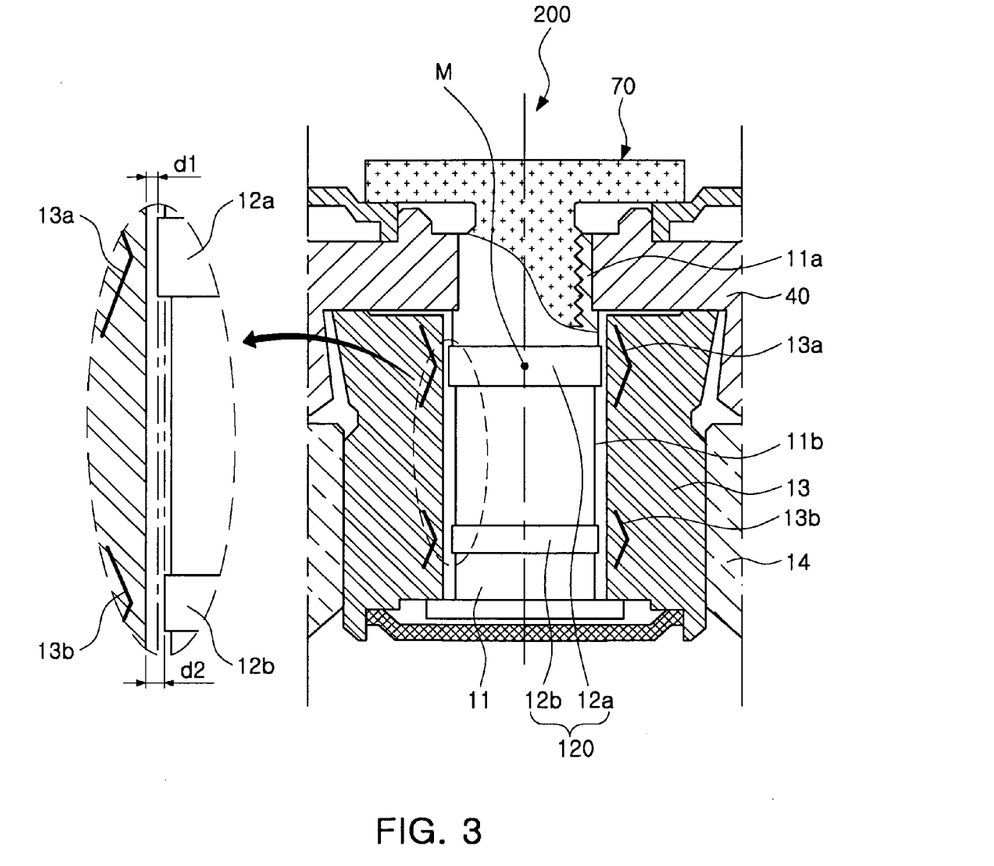
FIG. 3 is an enlarged sectional view schematically illustrating a bearing assembly of a motor according to another exemplary embodiment of the present invention.

FIG. 3 is an enlarged sectional view schematically illustrating a bearing assembly of a motor according to another exemplary embodiment of the present invention. With reference to FIG. 3, a motor 200 according to the present embodiment has rigidity reinforcing portions 12a and 12b formed on the shaft 11 and protruding therefrom so as to have different lengths.

More specifically, in the motor 200 according to this embodiment, a rigidity reinforcing portion 12a, corresponding to the upper dynamic pressure groove 13a, protrudes further than a rigidity reinforcing portion 12b, corresponding to the lower dynamic pressure groove 13b. Accordingly, a gap d1 between the upper dynamic pressure groove 13a and the rigidity reinforcing portion 12a is small, and a gap d2 between the lower dynamic pressure groove 13b and the rigidity reinforcing portion 12b is relatively large.

That is, in the motor 200 according to this embodiment, the gap d1 between the upper dynamic pressure groove 13a and the rigidity reinforcing portion 12a is smaller than the gap d2 between the lower dynamic pressure groove 13b and the rigidity reinforcing portion 12b. In this case, the rigidity of a hydrodynamic bearing formed between the upper dynamic pressure groove 13a and the rigidity reinforcing portion 12a is greater than that of a hydrodynamic bearing formed between the lower dynamic pressure groove 13b and the rigidity reinforcing portion 12b.

The motor 200 according to the present embodiment has a center of gravity in a location M in which the upper dynamic pressure groove 13a is formed on the axis of rotation of the shaft 11. Accordingly, in the case in which the motor 200 is configured to have the rigidity of the upper dynamic pressure groove 13a greater than that of the lower dynamic pressure groove 13b, vibrations generated when the shaft 11 and the rotor 40 rotate may be minimized.

Meanwhile, the invention is not limited thereto. For example, in a case in which a center of gravity of a motor is located in a lower dynamic pressure groove, a gap between the lower dynamic pressure groove and a corresponding rigidity reinforcing portion may be smaller than that between an upper dynamic pressure groove and a corresponding rigidity reinforcing portion, contrary to the structure of the above-described embodiment.

Also, a rigidity reinforcing portion may be formed to correspond to only a dynamic pressure groove having a center of gravity located therein, rather than corresponding to all the dynamic pressure grooves.

Figure 4:
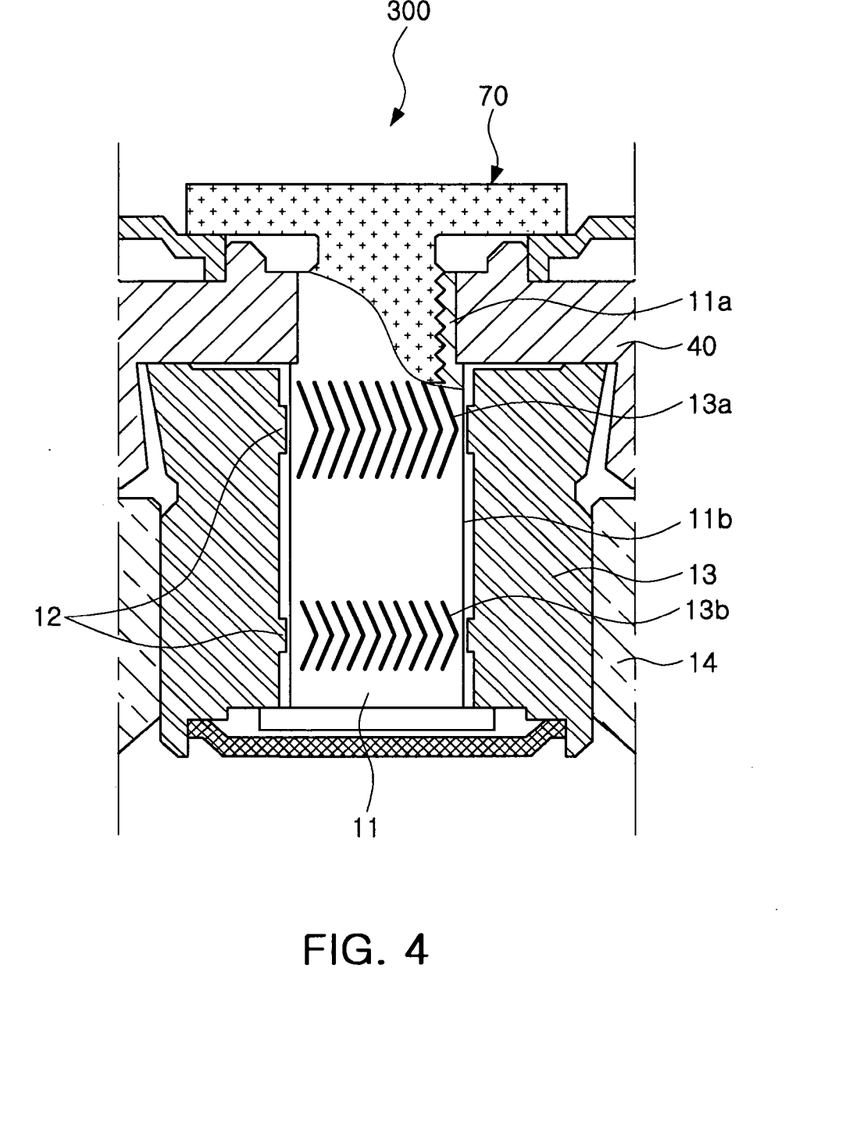
FIG. 4 is an enlarged sectional view schematically illustrating a bearing assembly of a motor according to another exemplary embodiment of the present invention.

FIG. 4 is an enlarged sectional view schematically illustrating a bearing assembly of a motor according to another exemplary embodiment of the present invention.

With reference to FIG. 4, a motor 300 according to the present embodiment has the dynamic pressure grooves 13a and 13b, each forming a hydrodynamic bearing, on the outer circumferential surface of the shaft 11, rather than on the inner circumferential surface of the sleeve 13.

Accordingly, the rigidity reinforcing portions 12, which reduce the gap between the sleeve 13 and the shaft 11, are formed on the inner circumferential surface of the sleeve 13, rather than the shaft 11.

With regard to the hydrodynamic bearing according to the present invention, the rigidity reinforcing portions 12 may be formed on at least one of the shaft 11 and the sleeve 13 as long as the gap between the shaft 11 and the sleeve 13 narrows.

Figure 5:
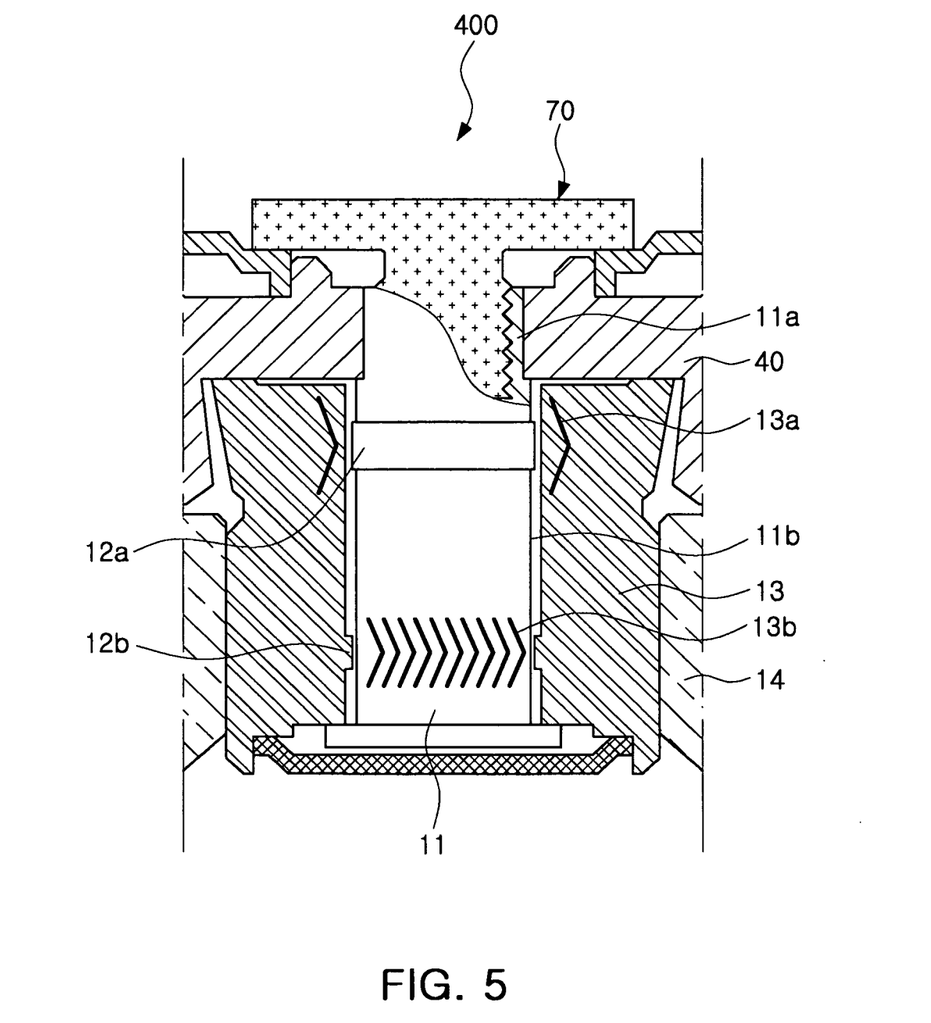
FIG. 5 is an enlarged sectional view schematically illustrating a bearing assembly of a motor according to another exemplary embodiment of the present invention.

FIG. 5 is an enlarged sectional view schematically illustrating a bearing assembly of a motor according to another exemplary embodiment of the present invention.

With reference to FIG. 5, a motor 400 according to the present embodiment has the rigidity reinforcing portions and the dynamic pressure grooves formed on both the shaft 11 and the sleeve 13.

That is, in the motor 400 according to this embodiment, the upper dynamic pressure groove 13a is formed in the inner circumferential surface of the sleeve 13 and the lower dynamic pressure groove 13b is formed in the outer circumferential surface of the shaft 11.

Accordingly, the rigidity reinforcing portions 12a and 12b are formed on the inner circumferential surface of the sleeve 13, corresponding to the upper dynamic pressure groove 13a, and the outer circumferential surface of the shaft 11, corresponding to the lower dynamic pressure groove 13b, respectively.

In the case in which the shaft 11 has the lower dynamic pressure groove 13b formed in the lower portion thereof and the rigidity reinforcing portion 12a formed on the upper portion thereof, when the shaft 11 is inserted into and assembled with the sleeve 13, the shaft 11 may be easily inserted into the sleeve 13 without being stuck by the rigidity reinforcing portion.

As described above, the motor according to the present invention may have at least one of the dynamic pressure grooves 13a and 13b in one surface of the outer circumferential surface of the shaft 11 or the inner circumferential surface of the sleeve 13 so as to generate dynamic pressure, and have at least one of the rigidity reinforcing portions 12a and 12b on the other surface thereof so as to correspond to the dynamic pressure grooves 13a and 13b. Through this configuration, the rigidity of the hydrodynamic bearing may be maximized and the power consumption of the motor may be minimized.

Figure 6:
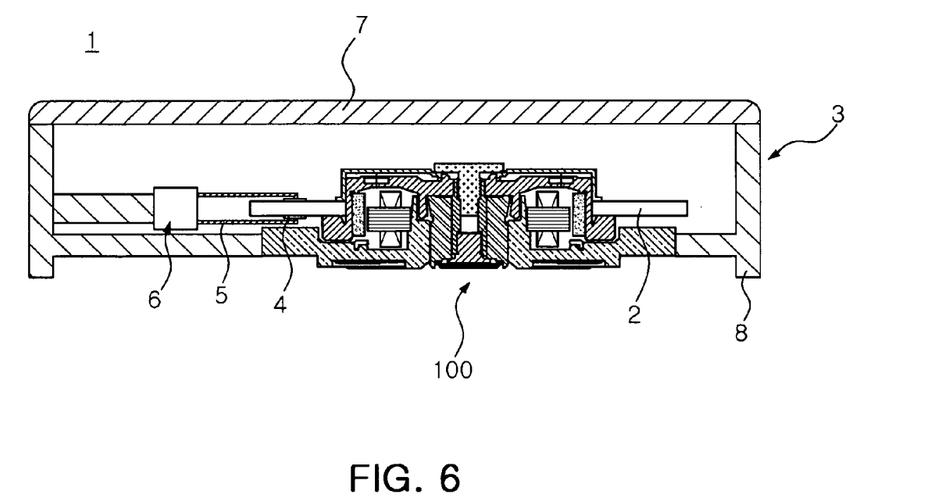
FIG. 6 is a schematic sectional view illustrating a recording disk drive device on which a motor according to an exemplary embodiment of the invention is mounted.

FIG. 6 is a schematic sectional view illustrating a recording disk drive device on which a motor according to an exemplary embodiment of the present invention is mounted.

With reference to FIG. 6, a recording disk drive device 1 according to this embodiment is a hard disk drive device and includes the motor 100, a head transfer unit 6, and a housing 3.

The motor 100 according to the aforementioned embodiment of the invention may be employed, and the recording disk 2 may be mounted thereon.

The head transfer unit 6 transfers a head 4, which reads information on the recording disk 2 mounted on the motor 100, to a surface of the recording disc 2 to be read. The head 4 is disposed on a support 5 of the head transfer unit 6.

The housing 3 may include a motor-mounted plate 8 and a top cover 7 shielding an upper portion of the motor-mounted plate 8 in order to form an internal space that receives the motor 100 and the head transfer unit 6.

The motor and the recording disk drive device according to the present invention are not limited to the above-described embodiments. The alternatives thereof may be available.

Also, in the above-described embodiments, a motor, which is provided in a recording disk drive device (for example, a hard disk drive), is exemplified. Various types of motors having a bearing that utilizes hydrodynamic pressure can be used.

As set forth above, according to exemplary embodiments of the invention, a rigidity reinforcing portion is formed on an outer circumferential surface of a shaft whose outer diameter is extended by as much as the rigidity reinforcing portion protruding therefrom. Since a gap between the shaft and a sleeve narrows in a location in which the rigidity reinforcing portion is formed, the rigidity of a hydrodynamic bearing formed between the shaft and the sleeve when the shaft is rotated can be increased.

Also, the rigidity reinforcing portion formed only in a location corresponding to a dynamic pressure groove of the sleeve, rather than in the entirety of the outer circumferential surface of the shaft, and accordingly, power consumption can be minimized and the rigidity of the hydrodynamic bearing can be ensured.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor comprising:
a sleeve having a cylindrical shape and including a hole whose inner circumferential surface has at least one dynamic pressure groove therein; and
a shaft rotatably inserted into the hole of the sleeve and having at least one rigidity reinforcing portion protruding in an outer diameter direction from an outer circumferential surface thereof corresponding to the dynamic pressure groove,
the rigidity reinforcing portion having a width smaller than that of the corresponding dynamic pressure groove.

2. The motor of claim 1, wherein the rigidity reinforcing portion has a width half that of the corresponding dynamic pressure groove.

3. The motor of claim 1, wherein the rigidity reinforcing portion has a central portion disposed to correspond to a portion of the corresponding dynamic pressure groove in which the largest amount of dynamic pressure is generated.

4. The motor of claim 1, wherein the rigidity reinforcing portion comprises at least two rigidity reinforcing portions protruding to have different lengths.

5. The motor of claim 1, wherein the dynamic pressure groove comprises at least two dynamic pressure grooves, and the rigidity reinforcing portion corresponding to one of the dynamic pressure grooves closest to a center of gravity of the motor protrudes to have the largest length.

6. A recording disk drive device comprising:
the motor according to claim 1;
a head transfer unit transferring a head, detecting information on a recording disk to be mounted on the motor, to the recording disk; and
a housing receiving the motor and the head transfer unit.

7. A motor comprising:
a shaft having at least one dynamic pressure groove in an outer circumferential surface thereof; and
a sleeve having the shaft rotatably inserted thereinto and having at least one rigidity reinforcing portion protruding in an inner diameter direction from an inner circumferential surface thereof corresponding to the dynamic pressure groove,
the rigidity reinforcing portion having a width smaller than that of the corresponding dynamic pressure groove.

8. The motor of claim 7, wherein the rigidity reinforcing portion has a central portion disposed to correspond to a portion of the corresponding dynamic pressure groove in which the largest amount of dynamic pressure is generated.

9. A motor comprising:
a shaft;
a sleeve having the shaft rotatably inserted thereinto; and
a fluid filling a gap between the shaft and the sleeve and generating dynamic pressure when the shaft rotates,
wherein at least one dynamic pressure groove is formed in one surface of an outer circumferential surface of the shaft or an inner circumferential surface of the sleeve so as to generate the dynamic pressure, and at least one rigidity reinforcing portion protrudes from the other surface thereof so as to correspond to the dynamic pressure groove,
the rigidity reinforcing portion having a width smaller than that of the corresponding dynamic pressure groove.

10. The motor of claim 9, wherein the rigidity reinforcing portion has a central portion disposed to correspond to a portion of the corresponding dynamic pressure groove in which the largest amount of dynamic pressure is generated.

* * * * *